(12) United States Patent
Davenport

(10) Patent No.: US 6,520,730 B1
(45) Date of Patent: Feb. 18, 2003

(54) LANDSCAPING TOOL ATTACHMENT FOR A FRONT DECK MOWER

(76) Inventor: Bobby Davenport, 1167 Kimberly Dr., Goodlettsville, TN (US) 37072

( * ) Notice: Subject to any disclaimer, the term of this patent is extended or adjusted under 35 U.S.C. 154(b) by 0 days.

(21) Appl. No.: 09/617,025

(22) Filed: Jul. 14, 2000

(51) Int. Cl.$^7$ ................................................ E02F 3/00

(52) U.S. Cl. .................... 414/686; 414/723; 414/912; 56/2; 56/DIG. 9; 56/DIG. 14

(58) Field of Search ................................ 414/680, 685, 414/686, 723, 912; 56/1, 2, DIG. 9, DIG. 14; 112/452; 280/468

(56) References Cited

U.S. PATENT DOCUMENTS

| | | | | |
|---|---|---|---|---|
| 5,114,299 A | * | 5/1992 | Roche et al. ............ | 414/722 X |
| 5,135,347 A | * | 8/1992 | Kaczmarczyk et al. ..... | 414/686 |
| 6,116,846 A | * | 9/2000 | Buckley ................. | 414/700 X |

* cited by examiner

Primary Examiner—Donald P. Walsh
Assistant Examiner—Kenneth W Bower
(74) Attorney, Agent, or Firm—Rick R. Wascher

(57) ABSTRACT

A motorized vehicle portion of a front deck mower and a tool attachment comprising a motorized vehicle portion of a front deck mower; a frame having a pair of spaced apart side frame portions; cooperating attachment for attaching the frame to existing structure associated with the motorized vehicle wherein a first portion of the cooperating attachment structure is associated with the motorized vehicle and the a second portion of the cooperating attachment structure is associated with the frame and the first and second portions of the cooperating attachment structure engage one another for attachment of the frame to the motorized vehicle; and a pressurized fluid actuated tool attachment operably supported by and removable from the frame.

The preferred cylinder assembly is operably attached to the frame and the tool attachment and preferably further comprises a pair of spaced apart pressurized fluid cylinders. The pair of spaced apart pressurized fluid cylinders are preferably attached to a pair of side frame portions and the tool attachment.

The preferred tool attachments are a tree carrying device having separable halves which articulate between an open and a closed position, or the attachment may be a bucket having hanger structure configured to operably engage the frame for secure attachment thereto during use. The hanger structure further includes pin means for securing the bucket to the frame, and the pressurized fluid actuated tool attachment is preferably a hydraulic tool attachment.

20 Claims, 3 Drawing Sheets

LANDSCAPING TOOL ATTACHMENT FOR A FRONT DECK MOWER

BACKGROUND OF THE INVENTION

1. Field of the Invention

The present invention relates generally to landscaping equipment including mowers and light duty front end loaders, etc., but more particularly to those machines having the capability to accept a variety of removable tool attachments or implements which enable the user to configure the equipment for a particular purposes.

The machine(s) that comprise the field of the invention consist have two basic components. The first component is a motorized vehicle and the second is the useful implement which is attached to the motorized vehicle (hereinafter simply referred to as a tool or tool attachment) making the basic motorized machine more useful and specially suited for a particular purpose, e.g., for mowing grass.

2. Description of the Related Art

In the landscaping industry as well as the nursery industry light duty equipment is preferred because of the low ground pressure of the tires or tracks which move the machinery or equipment. Light duty equipment is known to be less destructive on the lawn or sod on which it is operated. Further, such light duty equipment is believed to be more maneuverable and less expensive as compared to large heavy duty equipment thereby making the light duty machines more desirable.

For example, in many residential settings, a light duty front end loader such as a BOBCAT or MUSTANG has rubber tracks is deemed to be far more beneficial than a heavy steel tracked track loader or dozer, and a front deck mower is believed to be more useful than a mid or rear deck mower. However, even these light duty tracked vehicles are know to readily damage sod and turf due primarily to the ability of the machine to move the tracks independently which causes a ripping or tearing of the lawn sod between the tracks when the tracks are moved in opposite directions. Thus in many instances such vehicles are equipped with rubber tires which are preferred over tracks.

Front or rear deck mowers are also preferred over heavy farm tractors equipped with rotary cutter mowing decks because of their ability to mow quickly and effectively, turn in confined areas and leave little trace of visible damage to the lawn being mowed. Therefore, in many landscaping situations a front deck mower with its tight turning radius and low ground pressure from fat inflatable tires would be particularly useful if a variety of job specific implements or attachments were available for such a machine.

Until now, tool attachments such as a tree carrier or removable bucket for a front deck mower or a small front end loader (e.g., tree carrier embodiment) having rubber tires as the means for movement have not been invented.

Accordingly, it would be advantageous to provide the motorized vehicle portion of a front deck mower or a rubber tire driven front end loader with a tool attachment suited for uses other than mowing operations. Such attachments might include a removable bucket configured much like a front end loader scoop, and tree carrying tongs, etc.

SUMMARY OF THE INVENTION

The present invention comprises preferably a front deck mower with the mowing deck removed. Several companies manufacture and sell front deck mowers, and virtually all of them allow the mowing deck to be easily removed for servicing and maintenance. The particular brand of front deck mower is not critical so long as the tool attachment of the present invention is properly configured for cooperative engagement with the motorized vehicle portion.

The front mowing deck attaches to the base motorized vehicle (hereinafter the "motorized portion") by a series of frame supports and pin attachments, as well as a plurality of linkages for the blades and to raise and lower the cutting height of the deck. The frame structure of the motorized portion is thus capable of receiving a cooperatively configured attachment assembly of the mower deck. It is this cooperatively configured attachment assembly that is incorporated into the inventive attachments disclosed herein as well as other attachments not specifically shown herein.

The preferred invention is a combination of a motorized vehicle portion of a front deck mower machine or a tire driven front end loader and a removable front end loader type bucket or scoop (hereinafter referred to as the scoop embodiment) or a removable tree carrying bucket (hereinafter referred to as the tree carrier embodiment) in combination therewith, and a support frame interpositioned between the attachment and the motorized portion of the machine.

The support frame is equipped with the necessary cooperating structure useful for attaching the frame to the motorized portion and enable the user to manipulate the attachment during use. In addition, a control assembly, preferably of the hydraulic or pneumatic variety is also provided so the scoop embodiment can be raised and lowered and placed in the lift or dump positions, and the tree carrier embodiment is raised or lowed and placed in the carrying (closed) or setting (open) position.

The preferred frame further comprises a pair of spaced apart side frame members and a pair of cylinders adjacent the side frame members to enable the attachment to be moved and manipulated by the user of the apparatus.

The preferred embodiment(s) of the invention may be summarized in a variety of ways, one of which is the following: combination of a motorized vehicle portion of a front deck mower and a tool attachment comprising a frame having a pair of spaced apart side frame portions and a portion of a cooperating attachment structure configured for attachment to another portion of the cooperating attachment structure wherein this other portion of the cooperating attachment structure is associated with the motorized vehicle portion of the front deck mower; a tool attachment attached to the frame; and cylinder means for actuating the tool attachment during use.

The preferred cylinder means is operably attached to the frame and the tool attachment, the motorized vehicle portion of the front deck mower and the tool attachment, or the motorized vehicle portion of the front deck mower and the frame, and further preferably comprises a pair of spaced apart cylinders positioned adjacent each of the side frame portions.

The cylinder means also preferably further comprises pressurized fluid means for actuating the cylinder means, a pair of spaced apart cylinders positioned adjacent each of the side frame portions, and pressurized fluid means for actuating the cylinders, and at least one fluid pump and at least one control lever to regulate the flow of the associated pressurized fluid. The preferred pressurized fluid means is a pressurized hydraulic fluid means.

The present invention may also be summarized as follows: a motorized vehicle portion of a front deck mower and a tool attachment comprising a motorized vehicle portion of a front deck mower; a frame having a pair of spaced apart side frame portions; cooperating attachment means for attaching the frame to existing structure associated with the motorized vehicle wherein a first portion of the cooperating attachment structure is associated with the motorized vehicle and the a second portion of the cooperating attachment structure is associated with the frame and the first and second portions of the cooperating attachment structure engage one another for attachment of the frame to the motorized vehicle; and a pressurized fluid actuated tool attachment operably supported by and removable from the frame.

The preferred cylinder means is operably attached to the frame and the tool attachment and preferably further comprises a pair of spaced apart pressurized fluid cylinders. The pair of spaced apart pressurized fluid cylinders are preferably attached to a pair of side frame portions and the tool attachment.

The preferred tool attachments are a tree carrying device (the "tree carrier") having separable halves which articulate between an open and a closed position, or the attachment may be a bucket having hanger structure configured to operably engage the frame for secure attachment thereto during use. Th hanger structure further includes pin means for securing the bucket to the frame, and the pressurized fluid actuated tool attachment is preferably a hydraulic tool attachment. In either embodiment the hanger structure is merely provided as virtually any suitable means of operable attachment.

DETAILED DESCRIPTION OF THE PREFERRED EMBODIMENTS

Figure 1:
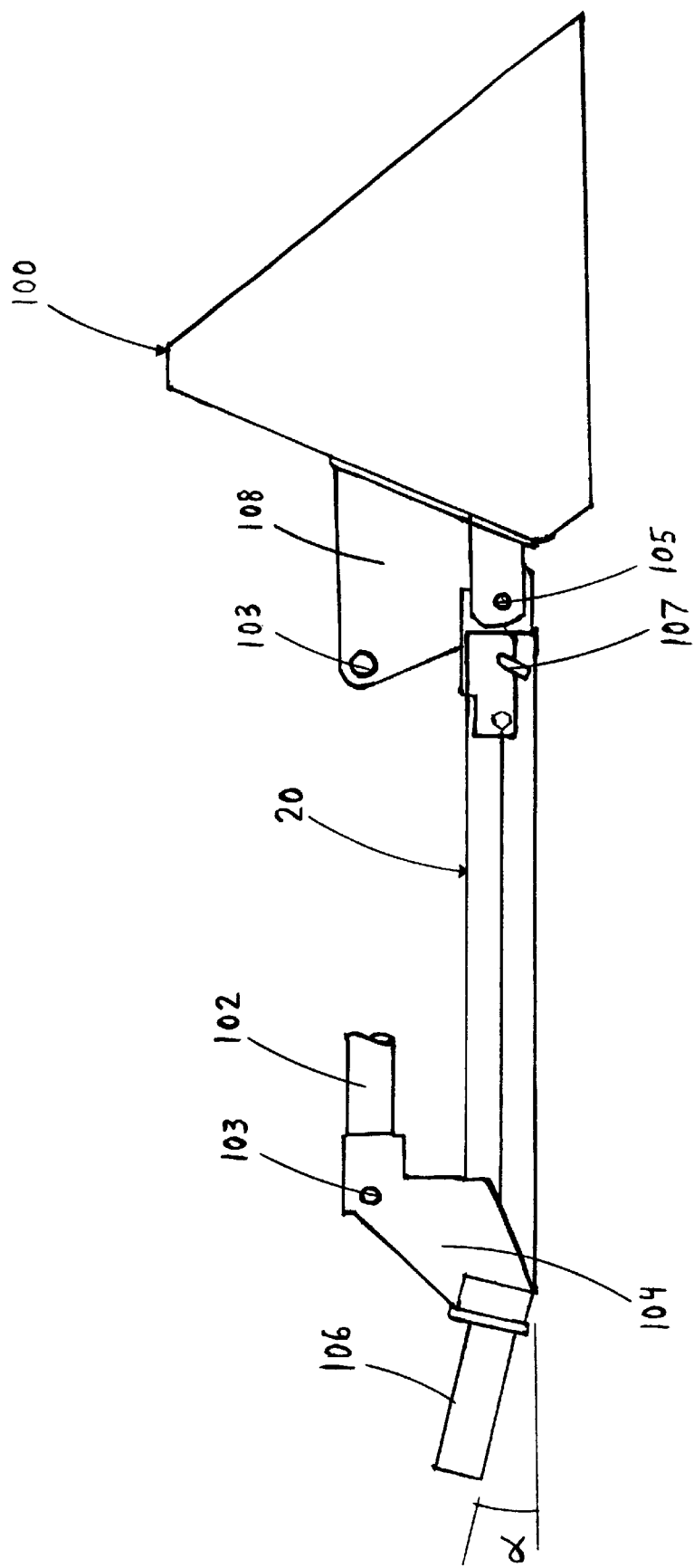
FIG. 1 is a side view of the embodiment of the presnet invention.
Figure 2:
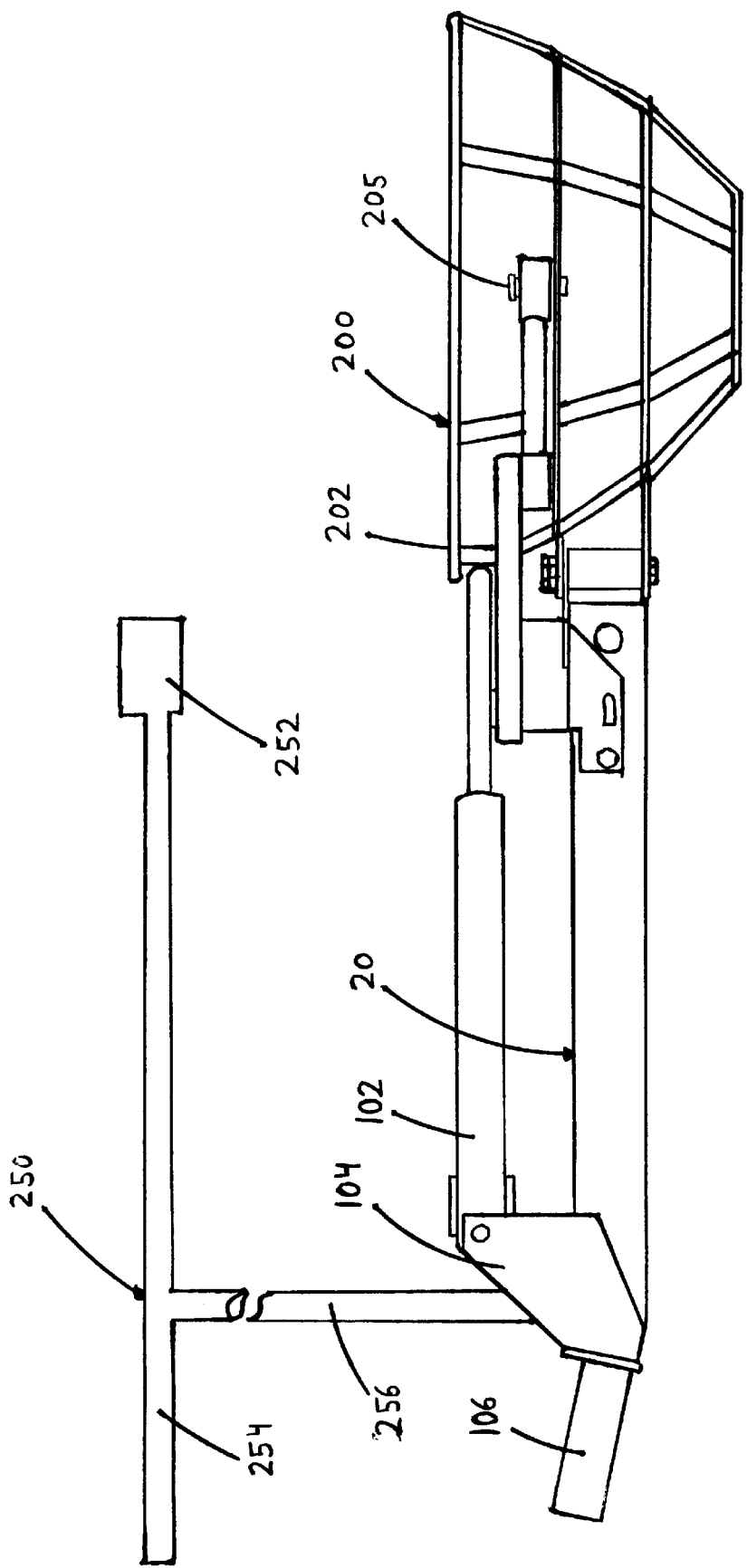
FIG. 2 is a side view of an alternate embodiment of the present invention.
Figure 3:
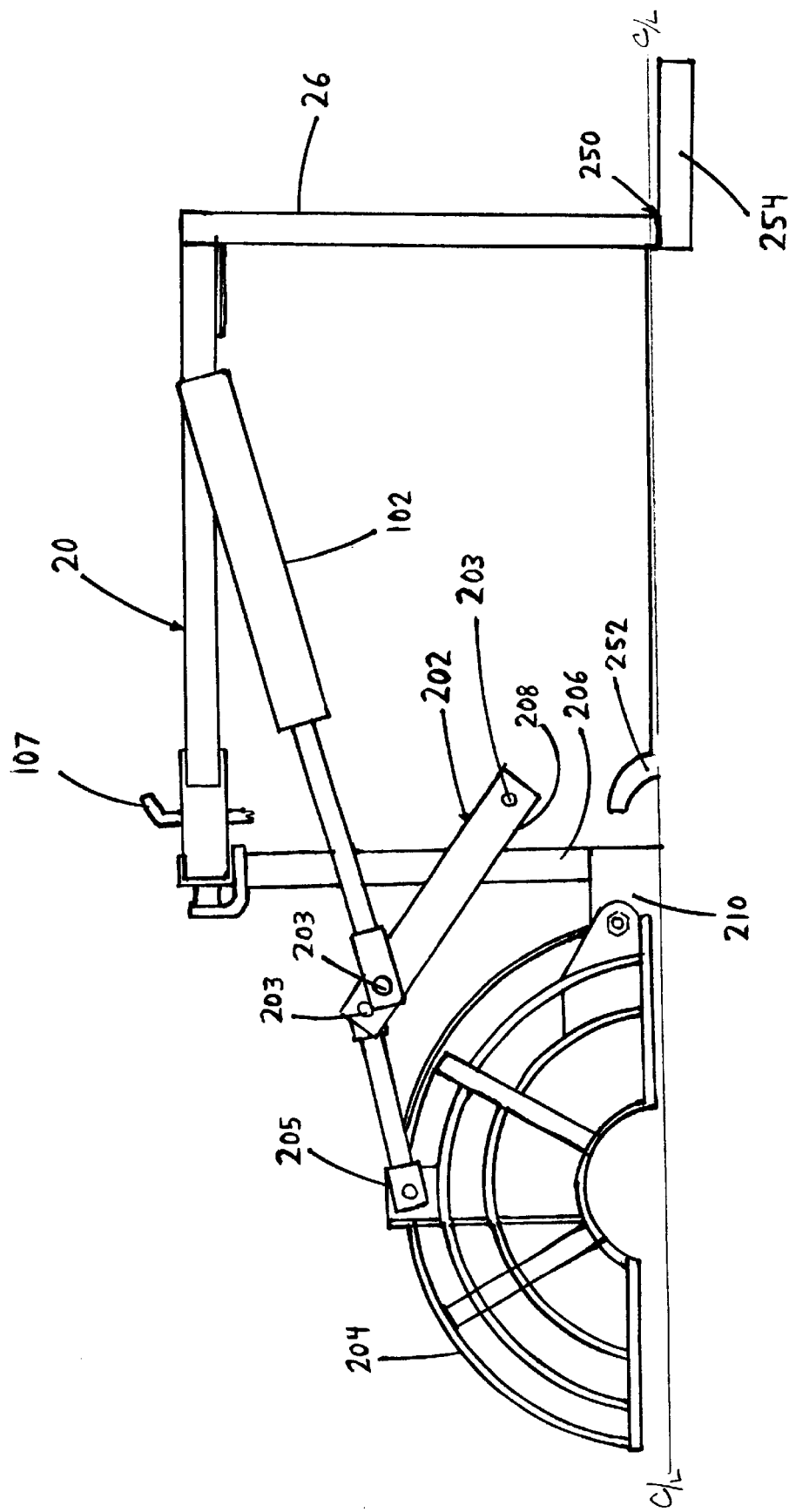
FIG. 3 is a top view of the embodiment shown in FIG. 2 and is provided to show the cantilever assembly.

With reference to FIGS. 1–3, the preferred embodiments of the present invention include spaced apart parallel arms 20 (only one of which is visible in the Figures) to which is fitted a tool attachment 100 (FIG. 1) and 200 (FIGS. 2–3).

Implement 100 is a scoop or bucket embodiment, and implement 200 is a balled tree carrying assembly. Both implements 100 and 200 employ the spaced apart arms 20 so as to enable the implement to be attached to a front deck mower (not shown) having the mowing removed. Implements 100 and 200 are allowed to pivot with respect to the frame at pivot points 105 and 205.

Referring to FIG. 1, the bucket 100 pivots at 105 from a rest position as shown in the drawings to a raised position (not shown) to form an angle Alpha with the ground surface. The pivoting of the bucket implement 100 is accomplished by a pair of spaced apart cylinders 102 (only one of which is visible in the Figure) which are positioned in a horizontal plane substantially parallel to a horizontal plane established by the spaced apart arms 20. Arms 20 are connected at opposing ends to the tilt plate 104 which is fastened to a mower tang 106 provided to engage the tang receptable (not shown) of the motorized vehicle (not shown). The tangs 106 are secured in place with respect to the receptable to prevent inadvertent withdrawl therefrom. This attachment may be virtually any suitable means of attachment including some fastener or bolt, or pin on arrangement.

Likewise the cylinders 102 are also preferably pinned in place at axle 103. The bucket implement 100 may be removed by disconnecting its cooperating attachment to the frame. As shown in the drawings, the user simply removes a pin-like key 107 from its assigned bore to allow the bucket flanges 108 to be tilted toward and away from the arms 20 during use.

With the preferred bucket attachment removed from the arms 20, the alternate attachment which is a tree carrier implement 200 (see FIGS. 2–3) may be attached to the arms in substantially a reverse manner however the distal connection of the cylinders 102 then attach to the cantilever assembly 202 of the carrier halves 204. The carrier halves 204 open and close by actuation of the cylinders 102. The cantilever assembly 202 having pivots 203 is attached to a portion of the carrier halves 204 at pivot 205 and the arms 20 which in this embodiment includes a front crossbar segment 206 having flanges 208 for attachment to the cylinders 102. The carrier halves 204 are partially supported by the front crossbar segment 206 at plate 210 extending therefrom in such a way as to allow the carrier halves 204 to be pivotal therewith.

Upright tree support assembly 250 is used to guide the trunk of a tree upward and away from the direction in which the carrier halves approach. In use, the user positions the motorized vehicle portion of the apparatus such that the tree trunk is leaning toward the vehicle. The operator of the vehicle then drives forward until the tree trunk nests within the C-shaped guide 252. If the operator continues to drive forward, the tree is raised upright and the carrier halves 204 surround the ball of the tree (not shown) for lifting after the carrier halves 204 are closed around it.

The C-shaped guide 252 extends from a horizontal arm 254 which in turn is supported by a vertical arm support 256. The horizontal arm 254 which is slidably engaged by the vertical support 256 so as to accommodate a variety of tree sizes and desired carrying angles.

These and other embodiments and/or equivalents thereof shall become apparent after consideration of the disclosure set forth herein via the specification, drawings and claims. All such alternate embodiments and/or equivalents hereof are contemplated as within the scope of the present invention even though not specifically set forth herein due to economy of space and print limitations.

What is claimed is:

1. An attachment structure between a motorized vehicle and a removable tool comprising:

parallel left and right arms with extensions at right angles to the axis of the arms attached to the vehicle;

parallel left and right arms attached to the removable tool;

wherein coupling means secure the removable tool to the motorized vehicle by operably engaging the left arms and right arms respectively;

parallel left and right hydraulic cylinders that are attached at one end to the removable tool and at the opposite end to the arm extensions;

wherein the hydraulic cylinders are parallel to the arms.

2. The combination of claim 1, wherein:

the cylinder means is operably attached to the frame and the tool attachment.

3. The combination of claim 1, wherein:

the cylinder means is operably attached to the motorized vehicle portion and the tool attachment.

4. The combination of claim 1, wherein:
the cylinder means is operably attached to the motorized vehicle portion and the frame.

5. The combination of claim 1, wherein the cylinder means further comprises:
a pair of spaced apart cylinders positioned adjacent each of the side frame members.

6. The combination of claim 1, wherein the cylinder means further comprises:
pressurized fluid means for actuating the cylinder means.

7. The combination of claim 6, wherein:
the pressurized fluid means is a pressurized hydraulic fluid means.

8. The combination of claim 1, wherein the cylinder means further comprises:
a pair of spaced apart cylinders positioned adjacent each of the side frame portions, and pressurized fluid means for actuating the cylinders.

9. The combination of claim 8, wherein the pressurized fluid means further comprises:
at least one fluid pump and at least one control lever to regulate the flow of the associated pressurized fluid.

10. The combination of claim 8, wherein:
the pressurized fluid means is a pressurized hydraulic fluid means.

11. A removable tool attachment for a motorized vehicle comprising:
a frame having a pair of spaced apart side frame members;
a first portion of a cooperating attachment structure configure for attachment to a motorized vehicle and a second portion of the cooperating attachment structure associated with a tool attachment to enable the first and second portions to operably engage one another and operably connect the tool attachment to the motorized vehicle; and
cylinder means for actuating the tool attachment during use wherein the cylinder means is positioned parallel to and supported by each of the side frame members.

12. A removvble attachment for a motorized vehicle comprising:
parallel left and right arms with extensions at right angles to the axis of the arms attached to the vehicle;
parallel left and right arms attached to the removable tool;
wherein coupling means secure the removable tool to the motorized vehicle by operably engaging the left arms and right arms respectively;
parallel left and right hydraulic cylinders that are attached at one end to the removable tool and at the opposite end to the arm extensions.

13. The tool attachment of claim 11, wherein:
the cylinder means is operably attached to the motorized vehicle portion and the tool attachment.

14. The tool attachment of claim 11, wherein:
the cylinder means is operably attached to the motorized vehicle portion of the frame.

15. The tool attachment of claim 1, wherein the cylinder means further comprises:
a pair of spaced apart cylinders positioned adjacent each of the side frame members.

16. The tool attachment of claim 1, wherein the cylinder means further comprises:
pressurized fluid means for actuating the cylinder means.

17. The tool attachment claim 1, wherein the cylinder means further comprises:
a pair of spaced apart cylinders positioned adjacent each of the side frame portions, and pressurized fluid means for actuating the cylinder means.

18. The tool attachment claim 17, wherein the pressurized fluid means further comprises:
at least one fluid pump and at least one control lever to regulate the flow of the associated pressurized fluid.

19. The combination of claim 1, wherein the tool is a bucket or a tree carrier.

20. The tool attachment of claim 12, wherein the tool is a bucket or a tree carrier.

* * * * *